Oct. 26, 1926.

J. PRELEUTHNER 1,604,784

FISH IMPALING AND HOLDING DEVICE

Filed Jan. 8, 1926

Inventor
Julius Preleuthner
By his Attorney
George C. Henricks

Patented Oct. 26, 1926.

1,604,784

UNITED STATES PATENT OFFICE.

JULIUS PRELEUTHNER, OF NEW YORK, N. Y.

FISH IMPALING AND HOLDING DEVICE.

Application filed January 8, 1926. Serial No. 80,002.

This invention relates to improvements in fishing implements, and particularly to a combined wabbler and hook having a nickel-plated or otherwise polished body or spoon gleaming and glittering during its movement through the water and adapted to attract the fish, particularly blue-fish, and to be offered to them either by throwing, casting or retrieving, and it is the principal object of the invention to provide a device of this type in which the impaled fish is positively held and prevented from working loose, by its efforts to escape.

Game fish, owing to their violent struggles frequently succeed in liberating themselves, even if the hook has been properly set, by enlarging the wound made by the hook and by finally throwing the hook out of the enlarged wound.

The object of the invention which also indicates its advantage is to prevent this possibility and this object is attained by combining with a hook a member adapted to close the gap between the point and the shank of the hook, thus obstructing the only avenue of escape.

These and other objects and advantages of the invention will become more fully known as the description thereof proceeds, and will then be more specifically defined in the appended claims.

The details of preferred forms of the invention are set forth in the following part of the specification and illustrated in the accompanying drawing, forming a material part of this disclosure, and in which.

Figure 1:
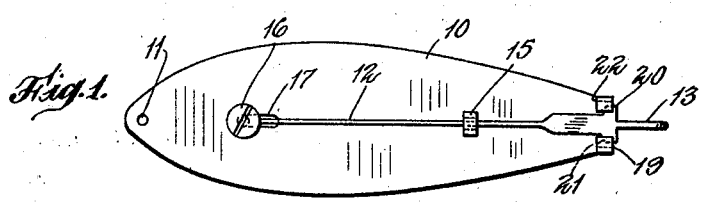
Fig. 1 is a top plan view of a device constructed according to the present invention with the hook in its wabbler engaging position.
Figure 2:
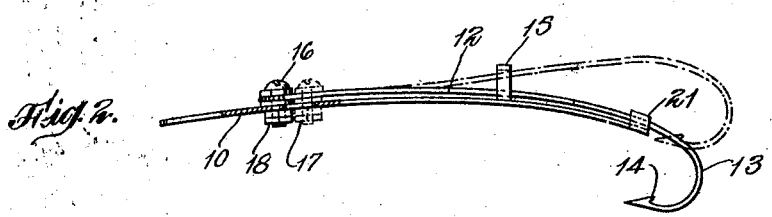
Fig. 2 is a side elevation thereof with the position assumed by the hook when disengaged from the wabbler indicated in broken lines.

Referring now to Figures 1 and 2, the member 10 represents an artificial bait, in this case a so-called wabbler which is in elongated, usually elliptical or fish-shaped, flat or bent, or dished piece of brightly painted or polished material, preferably metal. The wabbler or spoon 10 is provided at the front with a hole 11 for attachment of or to a trolling line (not shown) when the device is to be drawn through the water, either by trolling, or by casting and subsequent retrieving, the glitter of the spoon attracting and inducing fish to strike at it.

To one face of the spoon 10, the convex one, if it is bent or dished, is slidably attached the fish hook 13 which comprises a shank 12 and a point 14; the hook is preferably made of spring wire so as to be resilient and the attachment to the spoon is accompanied by a small bolt 16 and an adjusting nut 18. The shank of the bolt 16 is accommodated by an eye formed by the end of the shank 12 and by a slot 17 in the spoon; in order to retain the hook in the plane of symmetry of the spoon or wabbler, the slot 17 is disposed in the axial middle line of the spoon, and a U-shaped guide 15 is suitably fastened to the spoon along its middle line at an intermediate point between the slot 17 and the rear end of the device.

The hook and the spoon assume normally relative positions as shown in the drawing in dot and dash lines, and as in this position, the gap between the point and the shank of the hook is closed, it is conveniently called the "closed position."

The hook, however, may be forced into contact with the middle line of the spoon as shown in full lines and these two members may be retained in this position, conveniently called the "open position" by means of lateral wings or latches 19 and 20 suitably attached to the hook and lateral flanges 21, 22 formed with the material of the spoon underneath which the latches may be pushed by proper manipulation.

When said flanges engage the previously mentioned latches, the hook is prevented from assuming the "closed position".

The spoon is offered to the fish in the "open position" and a striking fish will impale himself on the hook, the pull on the hook during the act of setting it being too small to disengage the latches from underneath the flanges; but the pull of the impaled fish on the hook when drawn through the water overcoming the frictional resistance of the engaged parts will draw the latches from underneath the flanges and the parts will assume the "closed position" thus rendering impossible the escape of the fish. The friction may be suitably adjusted by manipulating the nut 18.

Figure 3:
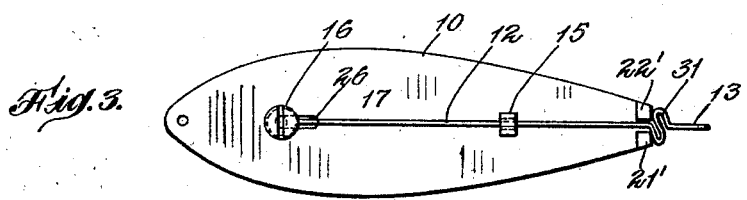
Fig. 3 is a top plan view of a modified form of my device.
Figure 4:
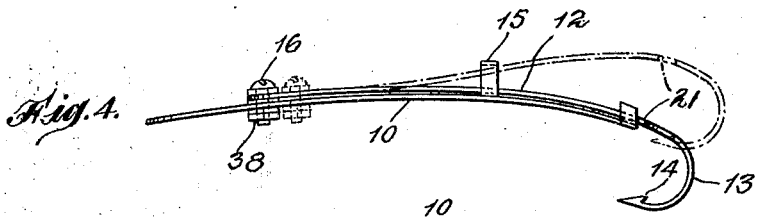
Fig. 4 is a side elevation thereof with the position assumed by the hook when disengaged from the spoon indicated in broken lines.

In the modification shown in Figures 3 and 4, the latches are formed by S-shaped bends 31 in the wire of the hook adapted to engage underneath lateral flanges 21', 22' formed with the material of the spoon.

Figure 5:
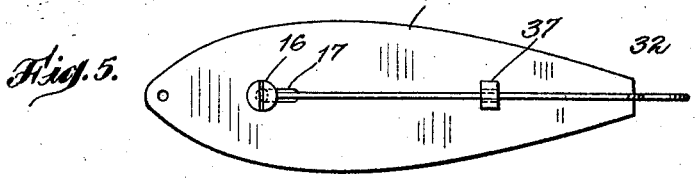
Fig. 5 is a top plan view of another modified form of my device.
Figure 6:
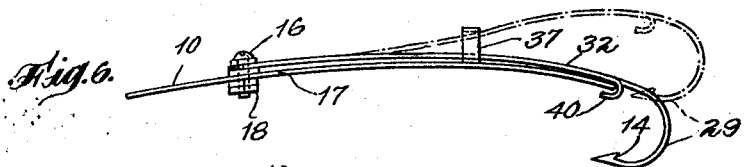
Fig. 6 is a side elevation thereof, showing the hook in broken lines in its position disengaged from the spoon.

In the modification illustrated in Figures 5 and 6, the wabbler is reduced to a strip or member, and the shank 32 is guided over the member by a guide 37 assuring sliding movement of the two members parallel to each other while the connecting bolt 18 serving as a stop limits the extent of said movement.

Figure 7:
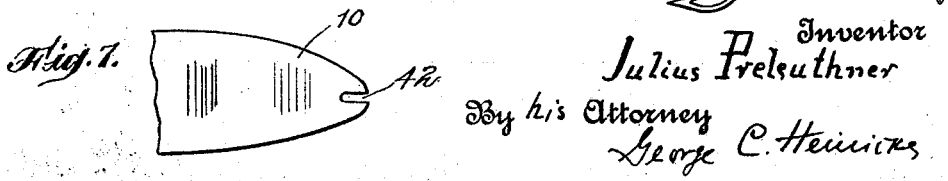
Fig. 7 is a fragmentary detail view of a further modification of my invention.

The catch or finger 40 is adapted to engage the tailed end of the spoon which may be plain or provided with a recess 42 as indicated in Figure 7.

The operation of the device will be entirely clear from the above detailed description, and it is to be understood that such changes may be made in the general arrangement and in the construction of the minor details of my device as shown as examples on the drawing, as fall within the scope of the appended claims without departure from the spirit of the invention and the principles involved.

Having thus described my invention, what I claim as new, and desire to secure by Letters Patent is:

1. In a fish impaling and holding device comprising a spoon, a hook combined therewith, means for normally holding said hook in engagement with said spoon, means for allowing a release of said hook from its holding means by the fish impaled on said hook, allowing an engagement of the hook with the end of said spoon for preventing the fish from escaping, and means for allowing the regulation of the frictional resistance offered by said hook during its release.

2. In a fish impaling and holding device comprising a spoon having an opening at one end for the attachment of a line, a hook combined with said spoon, a means for normally holding said hook in engagement with said spoon in the direction of its longitudinal axis, means for allowing a release of said hook from its holding means by a fish impaled on said hook exerting a pull in the direction of the longitudinal axis of said spoon, to release said holding means, and allowing an engagement between the hook and the end of said spoon to prevent the escape of the impaled fish, and a means for allowing the regulation of the frictional resistance offered by said hook during its release.

3. In a fish impaling and holding device comprising a glittering spoon having an opening near one of its ends for the attachment of a trolling line, and an elongated slot intermediate its ends, lateral flanges at the end of said spoon opposite to said opening, bent upon said spoon, a hook, a means on said hook adapted to engage beneath the flanges of said spoon for holding said hook against said spoon, a means displaceable in said elongated slot for holding the shaft of said hook and allowing its displacement in longitudinal direction, a guide for said shaft, said hook adapted to engage the end of said spoon upon its displacement in the direction of the longitudinal axis thereof by an impaled fish to disengage said flange engaging means, and a means for allowing a regulation of the frictional resistance offered by said hook against its longitudinal displacement.

4. In a fish impaling and holding device comprising a body, a fish impaling means associated with said body, means for normally holding said impaling means against said body allowing a disengagement therefrom by the pull of the impaled fish to engage said impaling means with the end of said body, and a means for regulating the frictional resistance offered to the displacement of said impaling means by the fish.

5. In a fish impaling and holding device allowing the use of a bait, comprising a curved body adapted to gleam when pulled through the water, said body having a hole at one end for the attachment of a line, and an elongated slot near said hole, a wire extending over said body in the direction of its longitudinal axis, a means for guiding said wire allowing a play of the same relative to said body, a means for displaceably holding said wire at one end in said elongated slot, a hook having a barb at the opposite end of said wire, a means for normally holding said hook and wire in engagement with said body but allowing a displacement of the wire and hook in longitudinal direction and relative to said body for permitting an engagement between hook and impaled fish thereon with the end of the wabbler.

6. In a fish impaling and holding device, wiggler and spinner comprising a glittering body having a hole for attachment of a line, and an elongated slot, a strip extending longitudinally along said body, a loop for guiding said strip allowing a certain play thereof relative to said body, a hook on the end of said strip adapted to engage the fish for impaling the same, said strip and hook adapted to be displaced in longitudinal direction by the impaled fish, means associated with said hook for normally holding the same engaged to said body allowing a disengagement therefrom under the pull of the impaled fish and a movement of said hook relative to said body for engaging the end of said body to hold the impaled fish securely against its working loose.

7. In a fish impaling and holding device comprising a plated body having an elongated slot near one of its ends, a strip extending longitudinally of said body, a screw passed through said slot, adapted to hold the end of said strip allowing a displacement longitudinally to said body, means on said screw for regulating the frictional resistance offered by said strip to its longitudinal displacement, a hook at the front end of said strip, a barb on said hook, a guide for said strip, a means associated with said hook for normally holding the same against said body, allowing a motion of said strip and hook from said body under their longitudinal displacement by the pull of an impaled fish and engagement of the hook with the end of said body for holding said impaled fish securely on said hook.

8. In a fish impaling and holding device comprising a wabbler, a wire extending longitudinally over said wabbler, a hook at one end of said wire, an S-shaped part intermediate said wire and hook adapted to engage the end of said wabbler to normally hold said hook and wire to said wabbler but allowing a disengagement therefrom and motion relative to said wabbler under the pull of a fish impaled on said hook, a means adjustably securing the end of said wire to said wabbler allowing said disengagement and longitudinal motion of wire and hook, means associated with said first named means for regulating the frictional resistance offered by said wire and hook to the pull exerted by the impaled fish, said hook adapted to engage the end of said wabbler after its displacement by the impaled fish to prevent the fish impaled on said hook from working itself loose.

9. In a fish impaling and holding device comprising a wabbler having a recessed body plate provided with an elongated slot, a hook having a shaft extending longitudinally to said body plate having a tendency to move away therefrom, means for displaceably holding the end of said shaft on said body plate, means for engaging the hook with the end of said plate being recessed, to hold said hook against said plate but allowing a disengagement therefrom under the pull of a fish impaled on said hook to allow said shaft to execute a movement away from said plate and said hook to engage the end thereof for preventing a fish impaled on said hook from working itself loose.

10. In a fish impaling and holding device comprising a wabbler plate, a shaft longitudinally extending over said plate of an elasticity adapted to impart to said shaft a tendency to move away from said plate, a hook on said shaft, a hook at the lower face of said first named hook adapted to engage the end of said plate for holding the same against the latter, allowing a disengagement therefrom under the pull of a fish impaled on said hook in longitudinal direction, means for securing the end of said shaft displaceably to said plate, means for guiding said shaft, means for regulating the degree of frictional resistance offered by said securing means to the longitudinal displacement of said shaft and hook, said hook adapted to engage the end of said plate after the disengagement of said second hook with the end of the plate to prevent an escape of the fish impaled upon said first named hook.

Signed at New York in the county of New York and State of New York this second day of January A. D. 1926.

JULIUS PRELEUTHNER.